Figure 1:
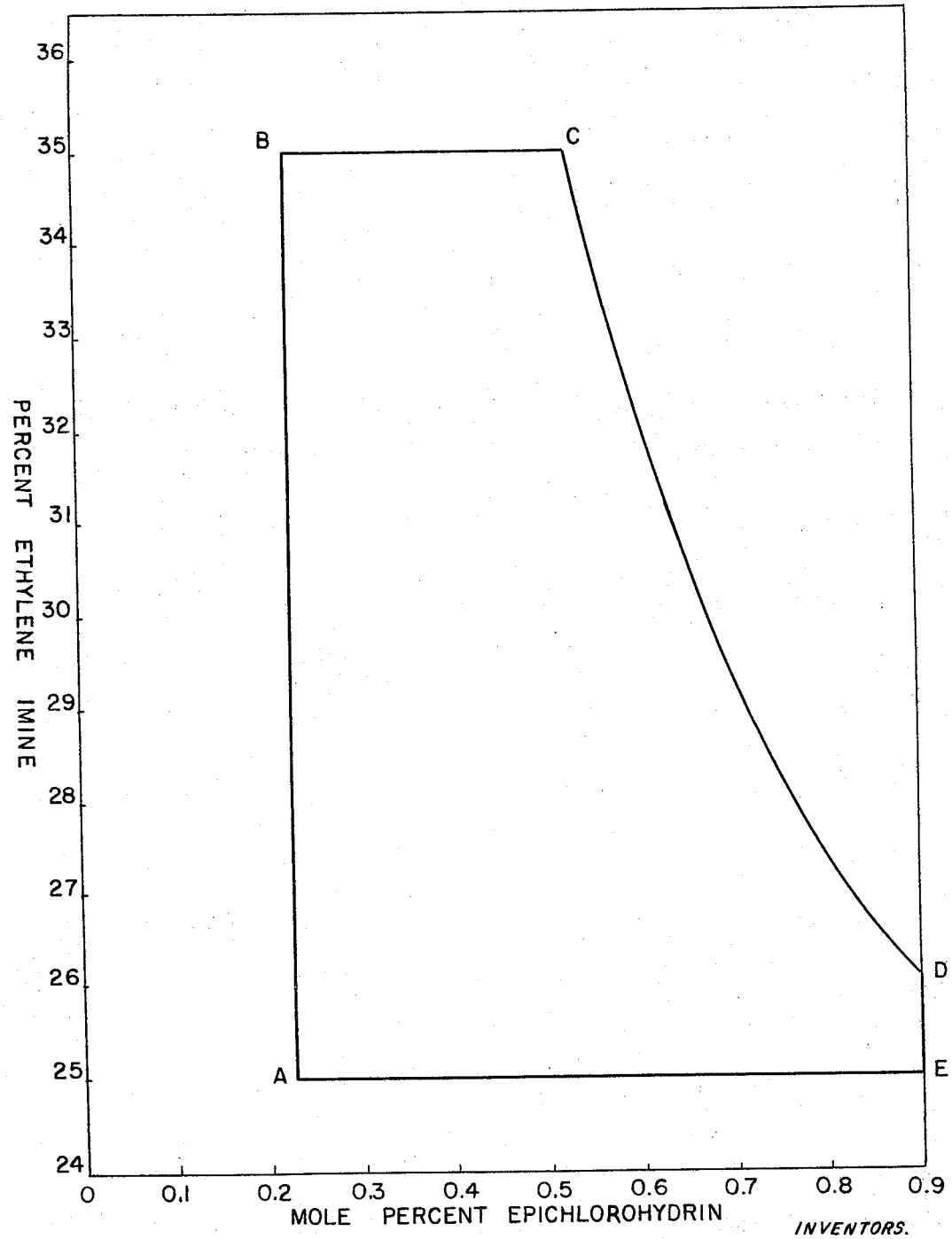

United States Patent Office 3,294,723
Patented Dec. 27, 1966

3,294,723
**COPOLYMER OF ETHYLENE IMINE
AND EPICHLOROHYDRIN**
Albert Goldstein, New Shrewsbury, and John W. Brook, Fanwood, N.J., assignors to Chemirad Corporation, East Brunswick, N.J., a corporation of Delaware
Filed July 9, 1965, Ser. No. 470,752
12 Claims. (Cl. 260—29.2)

This application is a continuation-in-part of copending application Serial No. 170,489, now abandoned.

The present application relates to a new copolymer of alkylene imines especially ethylene imine and epichlorohydrin, to a process for making it and to various valuable uses of the novel copolymer. One embodiment provides a process for promoting the drainage of liquids from solids.

The process of the invention comprises charging to a reaction zone a mixture of the two reactants the epichlorohydrin and the ethylene imine, reacting the mixture and further heating the copolymer product for a determined time. The sequence of interrelated steps that has been found highly advisable comprises charging the two reactants as an unreacted mixture in the specified amounts, and controlling the temperature of reaction to maintain it below the degradation temperature of the copolymer and generally within the temperature of about 90° C. to about 150° C., preferably from about 100° C. to 130° C. Moreover, when the reaction between the monomeric reactants is completed as may be evidenced by subsidence of the exothermic reaction, the copolymer is subjected to additional post-heating in the range of about 100° C. to 150° C. generally at reflux, such as at about 100° C. at atmospheric pressure. Heating is discontinued when the copolymer has a viscosity of at least about 1.00 centistokes determined at 25° C. for a 1% solution. If desired the polymer is concentrated under vacuum to the desired concentration, for instance, a 50% solution or until dehydrated. It is a unique aspect of the polymer of the invention that it can be dehydrated and still preserve its water-solubility essentially permanently.

It has been further found that it is highly desirable when the process of making the copolymer of the invention is run on a batch basis, to charge the reaction zone with a limited amount, such as from 0.5% to about 20% of the total charge of reactants to be used, subject the reactants to initial heating, preferably at reflux, and then charge the additional reactants. It has been further found that the process can be carried out on a continuous basis. The continuous process comprises charging the reaction zone with a copolymer of the invention, heating it to about 100° C., under an elevated pressure sufficient to substantially prevent vaporization and charging the reactants continuously to the system. The reactant copolymer solution is continuously withdrawn at a suitable time. Unusually desirable copolymers result from this sequence of steps. Variations from these steps and from the amounts of reactants bring about unsatisfactory results.

The unreacted mixture of epichlorohydrin and ethylene imine can be maintained unreacted at temperatures from 0° C. up to about 25° C. Upon heating at about 40° C. and upwardly thereof, the copolymerization reaction is started. Since the reaction is exothermic the reaction can be run under adiabatic conditions. The reaction may be run at a pressure from atmospheric pressure to 50 p.s.i., or higher. It is desirable to carry out the continuous process at a pressure in the range of about 5 to 20, preferably 10 to 18 p.s.i.

The reaction is preferably carried out in the absence of a catalyst, or non-catalytically. Suitable solvents in which to run the reactions include water, other inert organic solvents such as aliphatic or aromatic hydrocarbons, ketones, esters, ethers, the halogenated derivatives thereof and the like. One or more of these solvents can be substituted for the initial polymer charge in the continuous process.

The products of the invention are derived from a suitable alkylene imine. Most desirable at the present is ethylene imine. The other preferred comonomer is epichlorohydrin.

The specific class of copolymer of the invention is characterized by a concentration of ethylene imine ranging from about 25 to about 35%, preferably 29 to 33% by weight, and a proportion of about 0.225 to 0.9 mole percent, preferably 0.5 to 0.8 mole percent of epichlorohydrin. The specific copolymer within the preferred range given above possesses unusually advantageous properties even beyond the class copolymers of the invention. The copolymer of the invention is, further characterized by being substantially only epichlorohydrin cross-linked. The copolymers of the invention are further defined by reference to FIGURE I wherein they fall within the boundaries of lines AB, BC, CD, DE, and EA. Thus the copolymers of the invention comprise from about 0.225 to about 0.9 mole percent of epichlorohydrin and from about 99.775 to about 99.1 mole percent of ethylene imine. For amounts of epichlorohydrin ranging from 0.525 to 0.9, the polymers contain a decreasing proportion of ethylene imine following curve CD. Further, the class of copolymers of the invention is characterized by a viscosity of at least about 1.00 centistokes, preferably about 1.10 centistokes (determined in a 1% solution at 25° C.) and not more than 12,000 centistokes (determined on a 50% solution at 25° C.). The copolymers of the invention are, moreover, soluble in organic solvents and are water-soluble and stable as explained further hereinafter. It is actually unexpected that notwithstanding an increasing proportion of ethylene imine and decreasing epichlorohydrin, the polymers of the invention remain water-soluble and stable therein.

The specific class of copolymer of the invention is characterized by a unique combination of properties. The copolymers of the invention are not only water-soluble products but they remain as a homogeneous aqueous solution, i.e. retain their water-solubility over an extended period of time. This is in contrast to the behavior of conventional polymers of seemingly kindred types which may have initial water-solubility but which gel upon storage at room temperature. Such an illusory and temporary water-solubility of the conventional products gives unreliable and unsatisfactory results in applications where such polymers are used. Another unique advantage of the copolymer of the invention is that they can be dehydrated and still retain their water-solubility. In contrast conventional copolymers of this type lose their water-solubility characteristics and form a gel when held for one month, at 25° C. Moreover, the copolymer of the invention have Newtonian flow characteristics. As a result of these and other characteristics, the copolymers are highly valuable in numerous applications where the conventional products had numerous shortcomings and moreover the copolymers of the invention have a number of new and valuable uses.

The polymers of the invention are ideally suited as drainage and flocculation or agglomeration aids. Thus they are highly useful in all application where it is desired to accelerate the transfer of fluids by separation, partial or total, of their solid organic or inorganic components. In particular, the polymers excel as draining promoters under neutral and unexpectedly, even under acidic conditions.

The specification of the parent case, above mentioned

Example 1

In a reactor equipped with a reflux condenser, agitator and liquid feed apparatus charge 200 parts of an aqueous 30.0% ethylene imine solution containing, in addition, 0.78 part of epichlorohydrin (0.6 mole percent). This charge is heated to reflux and 800 parts of a 30.0% aqueous solution of ethylene imine containing 3.12 parts of epichlorohydrin are pumped in over a period of about one hour while maintaining gentle reflux. The reaction mixture is refluxed for one to two hours after which it is concentrated under vacuum to yield a 50% solution of polymer. The copolymer has a viscosity in 1% aqueous solution, at 25° C., of 1.22 cks. The product is admirably suited as a flocculation and drainage aid.

Example 2

Example 1 is repeated using an aqueous solution of ethylene imine to give a concentration of 25.9% ethylene imine and epichlorohydrin in a concentration of 0.90 mole percent. The reaction mixture is heated at reflux and then concentrated under vacuum to a 50% solution of the polymer. The product has a viscosity in 1% aqueous solution, at 25° C. of 1.22 cks.

The above procedure is repeated, the product being concentrated under vacuum till dehydrated. The viscous oil forms a stable water solution.

Example 3

Example 1 is repeated using an aqueous solution of ethylene imine to give a concentration of 27.0% ethylene imine and epichlorohydrin in a concentration of 0.81 mole percent. The reaction mixture is heated at reflux and then concentrated under vacuum to a 50% solution of the polymer. The product has a viscosity in 1% aqueous solution, at 25° C. of 1.42 cks.

The above procedure is repeated, the product being concentrated under vacuum till dehydrated. The viscous oil forms a stable water solution.

Example 4

Example 1 is repeated using an aqueous solution of ethylene imine to give a concentration of 27.0% ethylene imine and epichlorohydrin in a concentration of 0.70 mole percent. The reaction mixture is heated at reflux and then concentrated under vacuum to a 50% solution of the polymer. The product has a viscosity in 1% aqueous solution, at 25° C. of 1.05 cks.

The above procedure is repeated, the product being concentrated under vacuum till dehydrated. The viscous oil forms a stable water solution.

Example 5

Example 1 is repeated using an aqueous solution of ethylene imine to give a concentration of 31.9% ethylene imine and epichlorohydrin in a concentration of 0.59 mole percent. The reaction mixture is heated at reflux and then concentrated under vacuum to a 50% solution of the polymer. The product has a viscosity in 1% aqueous solution, at 25° C. of 1.27 cks.

The above procedure is repeated, the product being concentrated under vacuum till dehydrated. The viscous oil forms a stable water solution.

Example 6

Example 1 is repeated using an aqueous solution of ethylene imine to give a concentration of 33.2% ethylene imine and epichlorohydrin in a concentration of 0.56 mole percent. The reaction mixture is heated at reflux and then concentrated under vacuum to a 50% solution of the polymer. The product has a viscosity in 1% aqueous solution, at 25° C. of 1.28 cks.

The above procedure is repeated, the product being concentrated under vacuum till dehydrated. The viscous oil forms a stable water solution.

Example 7

Example 1 is repeated using an aqueous solution of ethylene imine to give a concentration of 33.9% ethylene imine and epichlorohydrin in a concentration of 0.54 mole percent. The reaction mixture is heated at reflux and then concentrated under vacuum to a 50% solution of the polymer. The product has a viscosity in 1% aqueous solution, at 25° C. of 1.30 cks.

The above procedure is repeated, the product being concentrated under vacuum till dehydrated. The viscous oil forms a stable water solution.

Example 8

In a suitable reactor there is charged a 30% aqueous solution of the copolymer of Example 1, and while recycling the copolymer within the reactor it is heated to about 100° C. There is then charged a solution of epichlorohydrin in water and 100% ethylene imine to a proportioning device and then fed to a mixing head at a rate of 16.3 pounds per hour in order to yield a mixture containing 28.6% of ethylene imine in water and epichlorohydrin in an amount to yield 0.74 mole percent based on ethylene imine. The addition rate is adjusted so as to yield an average residence time of about 1 hour in the reaction zone. The resulting exothermic reaction raised the temperature of the mixture to 100–102° C. after 3 hours. While the reactants are being fed to the reactor and reacted, the copolymer is continuously withdrawn thereby limiting the pressure to about 8.5 to 14 p.s.i.g. in the system. The copolymer is conveyed to a second stage reaction kettle wherein the product is continuously heated at reflux at about 100° C. for about 1 hour. The polymer product is obtained as a 28.3% solution. It has a viscosity of 320 cks. The resulting copolymer is highly valuable in promoting drainage of pulp both under neutral and acidic conditions.

Example 9

The pressure of Example 8 is repeated with the difference that the initial charge is water rather than the polymer. The amount of ethylene imine charge is 31.0%, the mole percent of epichlorohydrin is 0.68%. The feed rate is 17.4 pounds per hour for 5 hours and the reaction temperature is 100–108° C. The pressure in the system is maintained at 10–15 p.s.i.g. The resulting copolymer is obtained as a 32.0% solution. It has a viscosity of 297 cks. The product is highly useful as a flocculant and drainage aid.

Example 10

The procedure of Example 9 is repeated. The amount of ethylene imine charge is 31.9%, the mole percent of epichlorohydrin is 0.63%. The feed rate is 16.8 pounds per hour for 5 hours and the reaction temperature is 100–102° C. The pressure in the system is maintained at 12–16 p.s.i.g. The resulting copolymer is obtained as a 33.1% solution. It has a viscosity of 352 cks. The product is highly useful as a flocculant and drainage aid.

Example 11

The procedure of Example 9 is repeated. The amount of ethylene imine charge is 31.2%, the mole percent of epichlorohydrin is 0.89%. The feed rate is 16.2 pounds per hour for 8 hours and the reaction temperature is 101–106° C. The pressure in the system is maintained at 11–19 p.s.i.g. The resulting copolymer is obtained as a 31.5% solution. It has a viscosity of 341 cks. The product is highly useful as a flocculant and drainage aid.

Example 12

The procedure of Example 9 is repeated. The amount of ethylene imine charge is 27.7%, the mole percent of epichlorohydrin is 0.68%. The feed rate is 17.3 pounds per hour for 6 hours and the reaction temperature is 98–103° C. The pressure in the system is maintained at 13–18 p.s.i.g. The resulting copolymer is obtained as a 27.7% solution. It has a viscosity of 194 cks. The product is highly useful as a flocculant and drainage aid.

Example 13

The procedure of Example 8 is repeated. The amount of ethylene imine charge is 30.4%, the mole percent of epichlorohydrin is 0.68%. The feed rate is pounds 17.3 per hour for 5 hours and the reaction temperature is 99–102° C. The pressure in the system is maintained at 11–15 p.s.i.g. The resulting copolymer is obtained as a 31.0% solution. It has a viscosity of 96 cks. The product is highly useful as a flocculant and drainage aid.

The following examples illustrate the use of the polymer in the separation of fluids from solids.

Example 14

A suitable pulp was dispersed, beaten to a freeness of 60° SR and formed into hand sheets by normal drainage test methods (TAPPI std. T. 221). The various pH tested were reached by addition of 2% alum and sodium hydroxide or sulfuric acid as required. At pH 7.5 no alum was added. The polymers of the invention were added at a concentration of 0.05% solids based on dry fiber, except for the control. Pulp A designates bleached hardwood sulfite. Pulp B designates mixed waste paper. With this pulp 2.0% rosin size and 2.0% alum was used, with sodium hydroxide or sulfuric acid to achieve the desired pH. Pulp A also included 2% alum.

TABLE I.—PULP DRAINAGE

| Experiments | pH | Control, Sec./g. | Polymer, Percent Imp. |
|---|---|---|---|
| Pulp A: | | | |
| 14 | 7.5 | 7.82 | 26.2 |
| 15 | 6.5 | 4.88 | 10.5 |
| 16 | 5.5 | 5.03 | 8.2 |
| 17 | 4.5 | 5.07 | 7.3 |
| Pulp B: | | | |
| 18 | 6.5 | 3.62 | 18.2 |
| 19 | 5.5 | 3.74 | 20.1 |
| 20 | 4.5 | 3.66 | 13.4 |

Sec./g.=drainage rate measured in seconds per gram.
Percent Imp.=percent improvement base on Control (no additive).

The drainage improvement at acidic pH such as 5.5, is especially noteworthy since under such conditions drainage rates are generally difficult to improve.

The flocculation characteristics of the polymer of the invention are illustrated as follows:

Example 21

A dispersion of 400 p.p.m. of kaolin in water at pH 7.0±0.2 is treated in a standard jar test with 0.004% of the polymer based on clay solids (40 p.p.m. based on solids). The p.p.m. of clay solids remaining after flocculation in the supernatant liquid is determined by analysis in a Hellige Turbidimeter by reference to a standard curve of turbidity vs. p.p.m. clay. The results were compared with flocculation obtained with a commercial flocculant.

The polymer of the invention gave further improvement of at least 25% beyond that obtained with the commercial product. The polymer was thus able to clear the supernatant liquid of suspended particles after the use of the commercial product.

Generally the polymers of the invention are added to the aqueous medium in amounts sufficient to promote the separation of the liquid from the solids. Such amounts may be as low as 0.001% to 5 or 10% or more, depending on the particular nature of the solid materials separated. When cellulosic fibers are treated in aqueous suspensions the polymers may be used in amounts from 0.1% to about 5%, by weight. The process of the invention may be carried out under basic, neutral, or acidic conditions such as in the range from about a pH of 10 to 3.5. It is a particular advantage of the polymer of this invention that excellent drainage is obtained at a pH range from about 6 to 4.

The polymers of the invention are useful in promoting the separation of any type of solid materials from its aqueous environment. Inorganic materials such as clays, and various soil materials as well as organic materials such as sewage can be treated with the polymers of the invention to promote their separation from their liquid phase. The liquid phase may comprise water as well as other organic solvents for the polymer.

All examples are only illustrative of the invention. By replacement of suitable materials, or reactants, one skilled in the art may readily repeat the manipulative steps described herein to effect the purposes of the invention.

We claim:

1. A process for producing a stable, water-soluble co-polymer of ethylene imine with epichlorohydrin comprising feeding to a reaction zone a mixture of ethylene imine and epichlorohydrin in amounts falling within the area limited by lines AB, BC, CD, DE, and EA of FIG. 1, reacting said mixture at a temperature in the range of about 100° C. to 150° C., and further heating the resulting co-polymer at a temperature in the range of from about 100° C. to 150° C., and separating said co-polymer.

2. The process of claim 1 wherein the reactants are fed into the reactor in an aqueous solution.

3. The process of claim 1 wherein the concentration of ethylene imine is in an amount of from 29% to 33% and the mol percentage of the epichlorohydrin, relative to the ethylene imine, is within the area defined by the portions of the lines AB and CD, within the lines defined by the concentrations 29% and 33%.

4. A continuous process for forming a stable, water-soluble co-polymer of ethylene imine with epichlorohydrin, which comprises:
    (a) charging ethylene imine and epichlorohydrin to a reaction mixture in amounts defined by the area within the lines AB, BC, CD, DE and EA of FIG. 1;
    (b) reacting said mixture at a temperature in the range of about 100° C. to about 150° C. and a pressure in the range of about 5 to 20 p.s.i., and further heating the resulting co-polymer at a temperature in the range of about from 100° C. to 150° C., and separating said co-polymer.

5. The process of claim 4 wherein the reactants are charged to a heated aqueous solution of the co-polymer.

6. The process of claim 4 wherein the ethylene imine is contained in a concentration of from about 29% to 33%, the amount of said epichlorohydrin, relative to said ethylene imine, being limited to the area defined by the portions of the lines AB and CD within the lines defined by the concentrations 29% and 33%.

7. A stable water-soluble co-polymer of ethylene imine with epichlorohydrin in an amount of from about 0.225 to 0.9 mol percent made by the reaction defined in claim 1.

8. The co-polymer of claim 7, wherein said epichlorohydrin is present in the co-polymer in an amount of from about 0.525 to 0.9 mol percent, the remainder being substantially all ethylene imine.

9. A stable water-soluble co-polymer of ethylene imine with epichlorohydrin, containing from about 99.775 to about 99.1 mol percent of ethylene imine, and from about 0.225 to 0.9 mol percent of epichlorohydrin, said co-polymer being made by the reaction defined in claim 1 and further characterized by a viscosity, measured in a one percent solution at 25° C., of at least 1.00 centistoke and a viscosity, in a 50% solution measured at 25° C., of not more than about 12,000 centistokes.

10. The co-polymer of claim 9 wherein said epichlorohydrin is present in an amount of from about 0.525 to 0.9 mol percent, the remainder being substantially all ethylene imine.

11. A stable water solution of co-polymer of ethylene imine with epichlorohydrin wherein the ethylene imine is present in an amount of from about 99.775 to 99.1 mol percent and the epichlorohydrin is present in an amount of from about 0.225 to 0.9 mol percent, said co-polymer being made by the reaction defined in claim 1 and further characterized by a viscosity, in a 1% solution at 25° C., of at least about 1.00 centistoke and a viscosity, in a 50% solution at 25° C., of not more than about 12,000 centistokes.

12. The co-polymer of claim 11, wherein said epichlorohydrin is present in an amount of from about 0.525 to 0.9 mol percent, the remainder being substantially all ethylene imine.

References Cited by the Examiner

UNITED STATES PATENTS

| | | | |
|---|---|---|---|
| 2,272,489 | 2/1942 | Ulrich | 260—2 |
| 2,296,225 | 9/1942 | Ulrich | 260—57 |
| 3,210,299 | 10/1965 | Hagge et al. | 260—2 |

MURRAY TILLMAN, *Primary Examiner.*

J. C. BLEUTGE, *Assistant Examiner.*